United States Patent
Okada (12)

(10) Patent No.: US 6,456,328 B1
(45) Date of Patent: Sep. 24, 2002

(54) OBJECT-ORIENTED ADAPTIVE PREFILTER FOR LOW BIT-RATE VIDEO SYSTEMS

(75) Inventor: Hiroyuki Okada, Atlantic Highlands, NJ (US)

(73) Assignees: Lucent Technologies Inc., Murray Hill, NJ (US); Sharp Corporation, Osaka (JP)

( * ) Notice: Subject to any disclaimer, the term of this patent is extended or adjusted under 35 U.S.C. 154(b) by 0 days.

(21) Appl. No.: 08/827,911

(22) Filed: Dec. 18, 1996

(51) Int. Cl.$^7$ ................................................ H04N 7/26
(52) U.S. Cl. ...................... 348/390; 348/407; 348/607; 348/699
(58) Field of Search .................. 348/699, 390, 348/407, 384, 607, 711; 358/458; H04N 7/26

(56) References Cited

U.S. PATENT DOCUMENTS

| | | | |
|---|---|---|---|
| 4,635,098 A | 1/1987 | Thong | 348/489 |
| 4,951,129 A | 8/1990 | Lang | 348/610 |
| 4,967,272 A * | 10/1990 | Kao | 348/386 |
| 5,097,322 A * | 3/1992 | Fairhurst | 348/665 |
| 5,134,480 A | 7/1992 | Wang et al. | 348/620 |
| 5,245,445 A | 9/1993 | Tetsuo | 358/458 |
| 5,432,716 A * | 7/1995 | Lebowsky | 348/607 |
| 5,491,514 A | 2/1996 | Fukuda et al. | 348/397 |
| 5,557,330 A | 9/1996 | Astle | 348/394 |
| 5,682,205 A * | 10/1997 | Sezan | 348/452 |

FOREIGN PATENT DOCUMENTS

| | | | |
|---|---|---|---|
| EP | 0644696 A | 3/1995 | H04N/7/26 |
| EP | 0739141 A | 10/1996 | H04N/7/32 |

* cited by examiner

Primary Examiner—Howard W. Britton
(74) Attorney, Agent, or Firm—Patricia A Verlangieri (57) ABSTRACT

An object-oriented filter for filtering video images prior to video encoding is disclosed. The object-oriented filter is configured to include an image parameter extractor, a filter selector, and a filter. The image parameter extractor analyzes the input video sequences to map the location of pixels associated with one or more image parameters. Once the pixels associated with the image parameters are mapped, the filter selector ranks the identified image parameters based on their overall importance to the video sequence, and then selects a filtering factor for adjusting the strength of the filter used to filter the pixels associated with such identified image parameters. Thereafter, the pixels associated with each of the image parameters are filtered using the filter strength selected by the filter selector. An edge detector, skin detector, eyes-nose-mouth (ENM) region detector, and a moving region detector are optionally incorporated in the image parameter extractor when the image parameters identified are edge parameters, skin area parameters, eyes-nose-mouth (ENM) region parameters and moving region parameters, respectively.

22 Claims, 5 Drawing Sheets

PREVIOUS FRAME

CURRENT FRAME

FIG. 13

OBJECT-ORIENTED ADAPTIVE PREFILTER FOR LOW BIT-RATE VIDEO SYSTEMS

1. Field of the Invention

The present invention relates to a low bit-rate communication system for multimedia applications, such as a video teleconferencing system, and more particularly, to a method of, and system for, filtering video images prior to video coding.

2. Description of the Related Art

The storage and transmission of full-color, full-motion images is increasingly in demand. These images are used not only for entertainment, as in motion picture or television productions, but also for analytical and diagnostic tasks such as engineering analysis and medical imaging.

There are several advantages to providing these images in digital form. For example, digital images are more susceptible to enhancement and manipulation. Also, digital video images can be regenerated accurately over several generations with only minimal signal degradation.

On the other hand, digital video requires significant memory capacity for storage and equivalently, it requires a high-bandwidth channel for transmission. For example, a single 512 by 512 pixel gray-scale image with 256 gray levels requires more than 256,000 bytes of storage. A full color image requires nearly 800,000 bytes. Natural-looking motion requires that images be updated at least 30 times per second. A transmission channel for natural-looking full color moving images must therefore accommodate approximately 190 million bits per second. However, modem digital communication applications, including videophones, set-top-boxes for video-on-demand, and video teleconferencing systems have transmission channels with bandwidth limitations, so that the number of bits available for transmitting video image information is less than 190 million bits per second.

As a result, a number of image compression techniques such as, for example, discrete cosine transformation (DCT) have been used to reduce the information capacity (bytes) required for the storage and transmission of digital video signals. These techniques generally take advantage of the considerable redundancy in the image information for any natural image, so as to reduce the amount of information used to transmit, record, and reproduce the digital video images. For example, when an object in a video sequence has many pixels that are identical, the discrete cosine transformation (DCT) technique uses zero data components to identify such redundant pixels, so as to eliminate the image information (bytes) that is associated with such pixels from being compressed and transmitted. In contrast, the discrete cosine transformation technique uses non-zero data components to identify pixels that are not identical. Thus, if the video image to be transmitted is an image of the sky on a clear day, the discrete cosine transform (DCT) image data information has many zero data components, since there is little or no variation in the objects depicted for such an image. As a result, the image information of the sky on a clear day is compressed by transmitting only the small number of non-zero data components used to identify pixels that are not identical.

One problem associated with image compression techniques, such as discrete cosine transformation (DCT) is that for low bitrate applications, DCT techniques tend to produce decoded images disturbed by errors. One type of commonly occurring error is referred to as "mosquito noise", since its appearance in a decoded video segment gives the illusion of "mosquitoes" closely surrounding an object. "Mosquito noise" is typically present at the edges and contours of objects in a video sequence. Noise, such as "mosquito noise", occurs when there is too much image information to be coded in the video sequences, than there are bits available for transmission. For example, the DCT data information for edges and contours of objects depicted in a video sequence have many non-zero data components, since such areas contain few redundancies across the image. If the number of non-zero data components for the edges and contours of an object is larger than the number of bits available for transmission, such as, for example, with low bitrate telephony systems, some of the data components for the object are not coded accurately. As a result, some of the inaccurately coded data components get translated into images containing "mosquito noise", when the transmitted data components are decoded.

Typically, video image errors such as "mosquito noise", are reduced with the use of a prefilter which filters the video signal prior to image compression. The prefilter is characterized with a defined range of frequencies. When a video signal is input to the prefilter, only those frequencies contained in the video signal that are within the range of defined frequencies for the prefilter, are output to a video coder. The frequencies contained in the video signal that are outside the range of defined frequencies for the prefilter are suppressed. Thus, prefiltering essentially eliminates some of the image information from the video sequences, allowing the sequences to be coded using fewer bits, so as to reduce coding errors, such as, "mosquito noise".

Unfortunately, since the prefilter filters the video signal using a single, fixed range of frequencies, image information is uniformly eliminated from areas deemed important to the content of the video sequence as well as from areas that are deemed unimportant. For example, when a video sequence containing facial areas is prefiltered using a single, fixed range of frequencies, those frequencies of the facial areas that are outside of the range of defined frequencies for the prefilter, are suppressed. As a result, facial areas are often depicted with overly smoothed out features, giving the faces an artificial quality, since fine features such as wrinkles that are present on faces found in the original video sequence tend to be filtered out. Image areas of a video sequence that are typically deemed important include edges of objects, skin areas, facial regions and areas surrounding a moving object. Image areas of a video sequence that are deemed less important include the background of the image. Although, prefiltering of the video signal reduces the errors attributable to: coding, the use of a fixed range of filtering frequencies defines a single strength filter, which automatically eliminates image information from some important areas of the video sequence, resulting in an overall loss of picture quality when the original image is compared to a decoded version of the same image.

Accordingly, prefiltering arrangements that reduce the number of bits to be coded using image compression techniques continue to be sought.

SUMMARY OF THE INVENTION

The present invention is directed to an object-oriented filter for filtering video images prior to video coding and, in an illustrative application, is used in conjunction with the video coder of video encoding/decoding (Codec) equipment. The object-oriented filter initially analyzes an input video signal to map the location of picture elements (pixels) that are associated with one or more image parameters contained in the video sequences. The term image parameter as used herein refers to a parameter that is associated with a certain aspect of the video sequence. Examples of image parameters include the edges of objects, skin areas, eyes-nose-mouth (ENM) regions, and the areas surrounding moving objects.

Once the pixels associated with one or more of the image parameters are mapped, the object-oriented filter selects a filtering factor for each identified image parameter of the video sequence. The filtering factor adjusts the strength of the filter that subsequently filters those pixels associated with each identified image parameter. Thus, in a single frame of a video sequence the pixels associated with one or more image parameters are first mapped and then filtered by the object-oriented filter of the present invention using several differing filter strengths in contrast to the single filter strength utilized by filters of the prior art to filter all pixels of a video sequence.

The filtering factors are selected by ranking the identified image parameters in order of their importance to the overall video sequence. For example, if a video sequence depicts two persons walking across a field, the two persons walking would be deemed more important to the content of the video sequence than the field, since a viewer will tend to focus his or her attention toward a specific object contained in the video sequence (i.e., the two persons walking) instead of toward background scenery (i.e., the field).

The mapping of the location of pixels associated with one or more image parameters contained in a video sequence and the selection of a filtering factor that adjusts the strength of the filter which subsequently filters such pixels is advantageous. This is because the pixels are filtered according to their relative importance in the video sequence.

In the present illustrative example, the object-oriented filter is integrated with, but functions independently of, the other component parts of the video coding/decoding (Codec) equipment which includes an encoder, a decoder, and a coding controller. In one embodiment, the object-oriented filter is inserted between the input video signal and the encoder, to prefilter the input video signal prior to the encoding of the video images.

In one example of the present invention, the object-oriented filter includes an image parameter extractor, a filter selector and a filter. The image parameter extractor analyzes the input video sequences and maps the locations of pixels associated with at least one image parameter. The image parameter extractor is advantageously programmed to identify the previously named image parameters that are likely to be deemed important to the content of the video sequence.

Once the image parameter extractor has mapped the locations of pixels associated with the selected image parameters, the filter selector determines the relative importance of each image parameter to the overall video sequence. The filter selector identifies the relative importance of each image parameter based on a predetermined association such as a hierarchy. For example, if eyes-nose-mouth (ENM) regions, edge areas and skin regions are mapped by the image parameter extractor, than the filter selector is programmable to rank ENM regions as more important than edge areas, and rank edge areas as more important than skin regions.

After the identified image parameters are ranked according to their relative importance, a filtering factor for adjusting the strength of the filter used to filter the pixels associated with the image parameters, is selected by the filter selector. The filter selector advantageously selects a filtering factor to apply the weakest filter strength to pixels associated with image parameters that are deemed important to the content of the video sequence. The filter strength, as used herein, is the range of frequencies for the filter. A weak filter strength implies that a wide range of frequencies pass through the filter, so that very little image information (bytes) gets eliminated from pixels that are filtered using such a filter. In contrast, a strong filter strength implies that a narrow range of frequencies pass through the filter. Consequently, more image information (bytes) passes through a filter having a weak strength than a filter having a strong strength.

Once a filter factor is selected, the pixels associated with the identified image parameters are filtered by the filter. The filter is advantageously a separable filter and has a form which is a function of the filter factor, such as, for example, $$= \frac{1}{(2+N)^2} \boxed{1\,|\,N\,|\,1} \times \boxed{1\,|\,N\,|\,1}$$

where N is the filtering factor. For such a filter, a stronger filter strength corresponds to a smaller value of N.

The object-oriented filter of the present invention thereafter analyzes subsequent frames of the video sequence to identify image parameters and select the filtering factors useful for filtering such video frames. The object-oriented filter optionally uses the filtering factors selected for one frame of a video sequence to filter subsequent frames of the video sequence.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION

Figure 1:
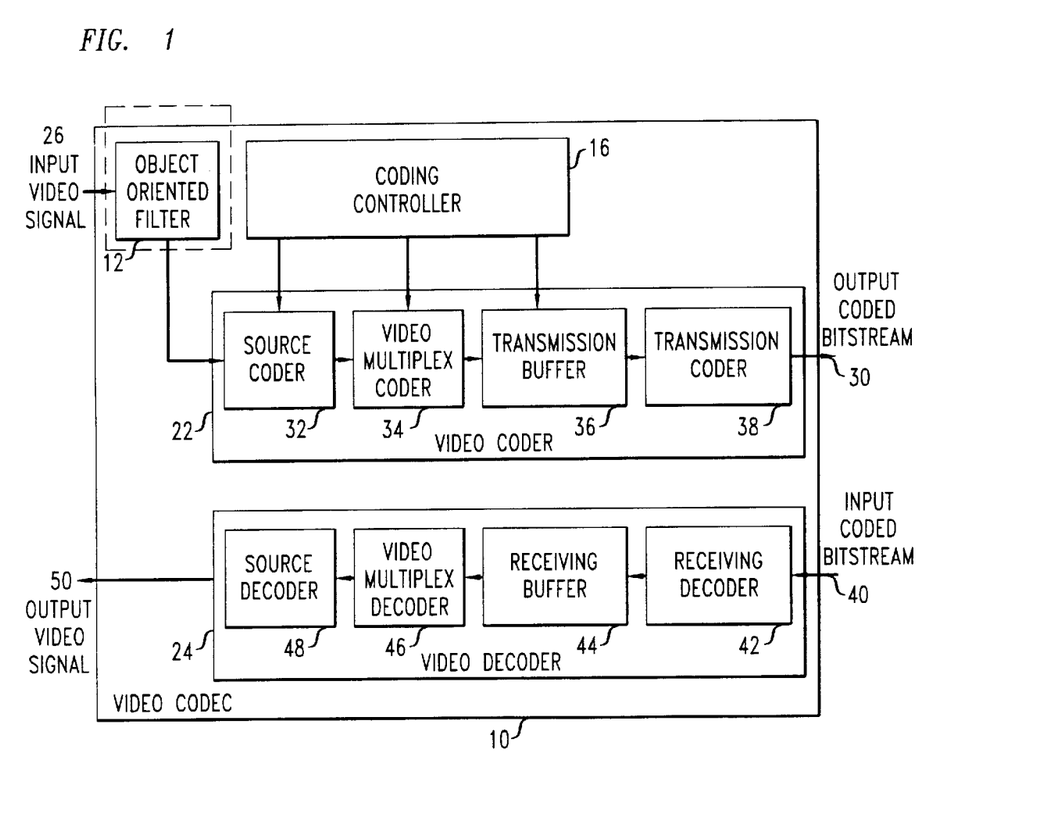
FIG. 1 is a block diagram of a video coder/decoder (Codec) embodying an illustrative application of the principles of the present invention.

FIG. 1 shows an illustrative application of the present invention wherein an object-oriented filter 12 is used pin conjunction with a video coding/decoding system such as, for example, video codec 10 (coder/decoder). Video coding/decoding systems such as video codec 10 are used primarily in the teleconferencing industry for the coding and decoding of video image sequences based on image compression techniques. An example of an image compression technique useful for the coding and decoding of video image sequences includes the Discrete Cosine Transform (DCT) method, described in ITU-T Recommendation H.263 ("Video coding for narrow communication channels"). It should be understood, of course, that the present invention is useful with video systems other than a video coder/decoder (codec), such as, for example motion picture editing equipment. Indeed, the present invention is applicable for use with any equipment to which a digital color video signal is input.

One embodiment of the present invention is illustrated in FIG. 1, which shows object-oriented filter 12 (enclosed with dashed lines), located within video codec 10. Object-oriented filter 12 is integrated with, but functions independently from, the other component parts of video codec 10. For example, video codec 10 includes additional component parts such as, coding controller 16, video coder 22 and video decoder 24. Such component parts will be discussed in conjunction with the following explanation of the operation of video codec 10.

Figure 2:
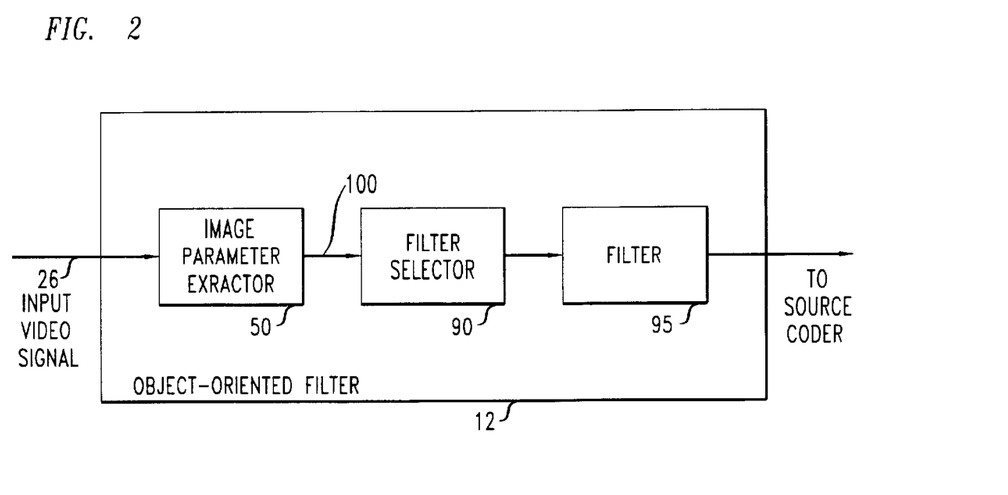
FIG. 2 is a block diagram of the object-oriented filter of the present invention.

Object-oriented filter 12, shown in greater detail in the block diagram of FIG. 2, includes an image parameter extractor 50, a filter selector 90, and a filter 95. The functions represented by the image parameter extractor 50, the filter selector 90, and the filter 95 are optionally provided through the use of either shared or dedicated hardware, including hardware capable of executing software. For example, the functions of image parameter extractor 50, filter selector 90, and filter 95 are optionally provided by a single shared processor or by a plurality of individual processors.

Also, the use of individual functional blocks representing image parameter extractor 50, filter selector 90, and filter 95 is not to be construed to refer exclusively to hardware capable of executing software. Examples of additional illustrative embodiments for the functional blocks described above, include digital signal processor (DSP) hardware, such as the AT&T DSP 16 or DSP32C, read-only memory (ROM) for storing software performing the operations discussed below, and random access memory (RAM) for storing digital signal processor (DSP) results. Very large scale integration (VLSI) hardware embodiments, as well as custom VLSI circuitry in combination with a general purpose digital signal processor (DSP) circuit are also optionally contemplated. Any and/or all such embodiments are deemed to fall within the meaning of the functional blocks labeled image parameter extractor 50, filter selector 90, and filter 95.

The present invention filters video images prior to coding of the video image sequences. Image parameter extractor 50 initially analyzes the input video images to map the locations of pixels associated with one or more image parameters contained in the video sequences. The mapping of pixels associated with image parameters is advantageous because image parameters that are deemed important are determined. For example, in video conferencing situations, a viewer tends to focus his or her attention toward the heads and faces of the person or persons in the scene. Thus, the analysis of a video frame to identify skin areas provides a high probability for the location of some heads and faces.

Pixels associated with identified image parameters are thereafter ranked by filter selector 90 based on the relative importance of each such identified image parameter, to the overall content of the video sequence. Based on the ranking of the identified image parameters, the filter selector determines a filtering factor for adjusting the strength of the filter that subsequently filters the pixels associated with each identified image parameter. As a result, a different filtering factor is selected for each identified image parameter and the pixels associated with each such image parameter are filtered using a different strength filter. The pixels associated with image parameters that are deemed important to the overall content of the video sequence are filtered using a weaker strength filter in order to avoid over-filtering such locations. Thus, filtering is object-oriented since the pixels associated with selected image parameters are filtered using different strength filters, as opposed to a filter of the prior art, which filters all pixels using a single strength filter.

The component parts of image parameter extractor 50, filter selector 90, and filter 95 are described below, with reference to FIG. 2, as part of an explanation of the operation of object-oriented filter 12. An input video signal 26 representing a sequence of frames corresponding to an image of an object as a function of time, is provided to object-oriented filter 12, from a conventional video camera (not shown) such as, for example, the View Cam, manufactured by Sharp Corporation.

Figure 3:
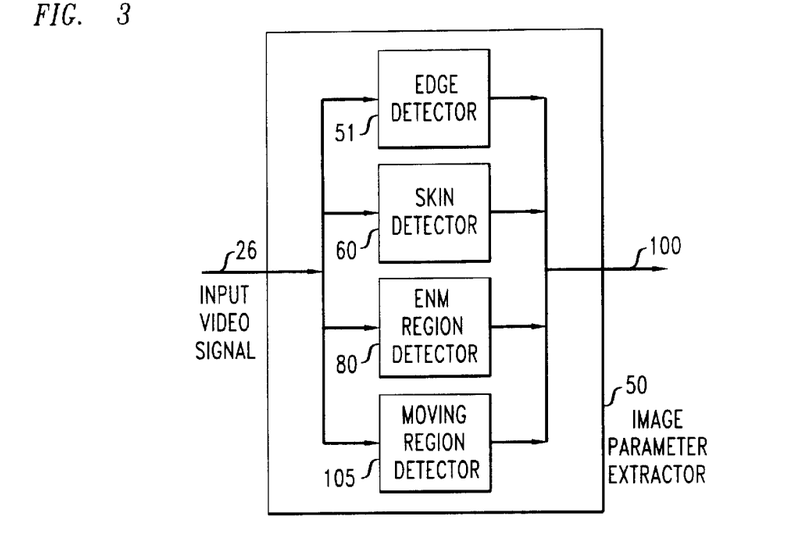
FIG. 3 shows a block diagram of the image parameter extractor of FIG. 2.

Image parameter extractor 50 as illustrated in FIG. 3, analyzes input video signal 26 to identify the pixels associated with one or more image parameters contained in the video frame that are likely to be deemed important to the content of the video sequences. Once the pixels associated with the identified one or more image parameters are determined, an image parameter location signal 100 is generated and provided to filter selector 90. Several examples of image parameters that are optionally identified by image parameter extractor 50, include the edges of objects, skin areas, eyes-nose-mouth (ENM) regions, areas surrounding moving objects, and background areas.

Figure 4:
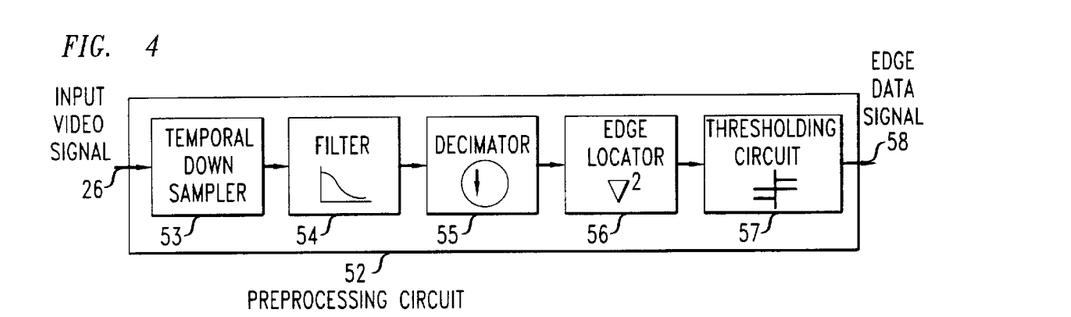
FIG. 4 is a block diagram of the edge detector of FIG. 3.

In one embodiment of the present invention, wherein the image parameter optionally identified are the edges of objects, the image parameter extractor 50 includes an edge detector 51, as shown in FIG. 3. The edge detector 51 advantageously functions to analyze regions of the video image to identify pixels associated with the edges of objects contained in the video frame. The edge detector 51 incorporates a preprocessing circuit 52, as illustrated in FIG. 4, including a temporal downsampler 53, a filter 54, a decimator 55, an edge locator 56 and a thresholding circuit 57.

Temporal downsampler 53 functions to limit the number of frames of the video signal that are available for edge detection by limiting the number of frames available for analysis from input video signal 26. As an illustrative example, a typical frame rate for a video signal such as input video signal 26 approximates 30 frames per second (fps), with each successive frame containing information essentially identical to that of the previous frame. Since successive frames contain essentially identical information, it is advantageous to reduce computational complexity by selecting only a small number of frames from the video signal for edge detection. Thus, regarding the present example, assume that the downsampler, in order to reduce computational complexity, selects only every fourth frame of the input video signal for edge detection. As a result, the downsampler reduces the frame rate input into the edge detector, from a rate of about 30 frames per second (fps) to a rate of about 7.5 frames per second (fps).

Filter 54 is typically a separable filter for performing spatial filtering of a downsampled video frame, having a size 352×288 pixels and with a cut-off frequency of where c is advantageously equivalent to the decimation (division) factor, discussed below. Typically, a filter such as filter 54 defines a range of frequencies. When a signal such as downsampled input video signal 26 is provided to filter 54, only those frequencies contained in the video signal that are within the range of defined frequencies for the filter are output. The frequencies contained in the video signal that are outside the range of defined frequencies for the filter, are suppressed. Examples of filter 54 include finite impulse response (FIR) filters and infinite impulse response (IIR) filters.

Filter 54 of preprocessing circuit 52 is not to be confused with filter 95 of object-oriented filter 12. The purpose of filter 54 is to filter a portion of input video signal 26 in order to determine the location of pixels associated with the edges of objects contained in the video sequence. Filter 54 does not permanently suppress the video signal frequencies of input video signal 26. In contrast, filter 95 of object-oriented filter 12 filters input video signal 26 and permanently suppresses the video signal frequencies of pixels associated with selected image parameters prior to the coding of the video sequence.

The filtered video signal is input to decimator 55 where both the horizontal and vertical dimensions of the video image frame are partitioned into image areas having smaller predetermined sizes, for edge analysis. As an illustrative example, if a decimator such as decimator 55 has a decimation factor of c=8, and the video image frame has dimensions of 352×288 pixels, then the video image frame is partitioned into image areas with dimensions of 44×36 pixels.

Edge locator 56 performs edge detection on each of the partitioned image areas of the video image frame, searching for the edges of objects. The edge of an object in any video image frame is typically characterized by the changes in the magnitude of the pixel intensities for adjacent pixels. For example, if an image area of size 3×3 pixels does not contain an edge of an object, the magnitude of the pixel intensities for adjacent pixels, representative of such an image area, are nearly equivalent, as shown in matrix A, $$A = \begin{vmatrix} 11 & 10 & 10 \\ 10 & 10 & 10 \\ 10 & 10 & 11 \end{vmatrix}$$

In contrast, if a similar image area of size 3×3 pixels, contains the edge of an object, the magnitudes of the pixel intensities for adjacent pixels, representative of such an image area, contain sharp transitions, as shown in matrix B, $$B = \begin{vmatrix} 10 & 50 & 90 \\ 50 & 50 & 90 \\ 90 & 90 & 90 \end{vmatrix}$$

Edge locators such as, edge locator 56, utilize techniques including, Sobel operator techniques, to identify the edges of objects by summing the squares of the convolution of two-dimensional Sobel operators such as, $\delta_x$ and $\delta_y$, with the magnitudes of the pixel intensities for adjacent pixels, shown for example, in either matrix A or B, for a partitioned image area. As an illustrative example, using the Sobel operator technique, if the Sobel operators, represented in two dimensional form by the horizontal $\delta_x$ and vertical $\delta_y$ operators, described below, $$\delta_x = \begin{vmatrix} -1 & 0 & 1 \\ -2 & 0 & 2 \\ -1 & 0 & 1 \end{vmatrix} \quad \delta_y = \begin{vmatrix} 1 & 2 & 1 \\ 0 & 0 & 0 \\ -1 & -2 & -1 \end{vmatrix}$$

are convolved with the magnitudes of the pixel intensities for adjacent pixels in an image area that does not contain the edge of an object such as, for example, the pixel intensities for the adjacent pixels of matrix A, as shown below, $$\delta_{xA} = \begin{vmatrix} -1 & 0 & 1 \\ -2 & 0 & 2 \\ -1 & 0 & 1 \end{vmatrix} * \begin{vmatrix} 11 & 10 & 10 \\ 10 & 10 & 10 \\ 10 & 10 & 11 \end{vmatrix} \quad \delta_{yA} = \begin{vmatrix} 1 & 2 & 1 \\ 0 & 0 & 0 \\ -1 & -2 & -1 \end{vmatrix} * \begin{vmatrix} 11 & 10 & 10 \\ 10 & 10 & 10 \\ 10 & 10 & 11 \end{vmatrix}$$

the resulting convolution produces, in part, the result shown below, $\delta_{xA}=(-1\times11)+(0\times10)+(1\times10)+(-2\times10)+(0\times10)+(2\times10)+(-1\times10)+(0\times10)+(1\times11)\cong0$ $\delta_{yA}=(1\times11)+(2\times10)+(1\times10)+(0\times10)+(0\times10)+(0\times10)+(-1\times10)+(-2\times10)+(-1\times11)\cong0$ whose magnitudes approximate zero in two dimensions. In contrast, if the Sobel operators are convolved with the magnitudes of the pixel intensities for adjacent pixels in an image area that contains the edge of an object such as, for example, the magnitudes of the pixel intensities for the adjacent pixels, shown in matrix B, the resulting convolution produces, in part, the result shown below, $\delta_{xB}=(-1\times10)+(0\times50)+(1\times90)+(-2\times50)+(0\times50)+(2\times90)+(-1\times90)+(0\times90)+(1\times90)\cong160$ $\delta_{yB}=(1\times10)+(2\times50)+(1\times90)+(0\times50)+(0\times50)+(0\times90)+(-1\times90)+(-2\times90)+(-1\times90)\cong-160$ whose magnitudes do not approximate zero. Edge detection techniques utilizing, for example, the above described Sobel operator techniques, are performed for each of the partitioned 44×36 pixel areas of the video frame.

Thresholding circuit 57 then identifies those pixels in each 44×36 partitioned area, whose magnitude of convolved, and summed absolute values of pixel intensity for adjacent pixels are larger than a specified value, assigning such identified pixels a non-zero numerical value. Pixels having a magnitude of convolved, and summed absolute values of pixel intensity for adjacent pixels less than the specified value of thresholding circuit 57, are assigned a zero numerical value. Edge data signals 58 corresponding to the non-zero pixel values are subsequently generated by thresholding circuit 57 and are provided to filter selector 90.

The incorporation of a thresholding circuit, such as, thresholding circuit 57, advantageously prevents contoured areas of an object contained in a video sequence that are not edges, from being misidentified as edges by edge detector 51. This is because small variations in the magnitudes of the pixel intensities for adjacent pixels typically produces convolved, and summed absolute values of magnitude that are less than the specified value of the thresholding circuit.

Figure 5:
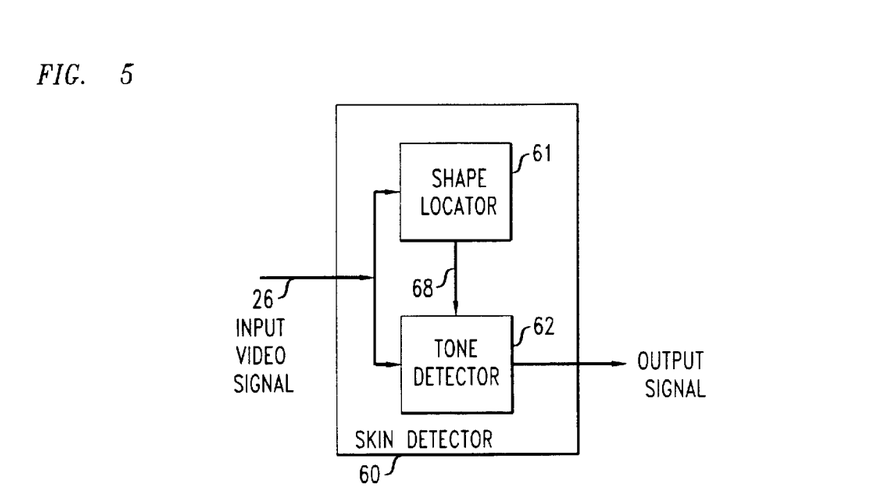
FIG. 5 is a block diagram of the skin detector of FIG. 3.

In one embodiment of the present invention, wherein the image parameter optionally identified are skin are as, image parameter extractor 50 includes a skin detector 60, as shown in FIG. 3. Skin detector 60 advantageously functions to identify pixels associated with skin areas by initially analyzing the shape of objects in a video sequence to locate one or more objects that are likely to contain skin areas. Objects that are likely to contain skin areas are further analyzed to determine if the picture elements (pixels) of any such object or objects have signal energies characteristic of skin regions. The color tones of objects with pixels that have signal energies characteristic of skin regions are then sampled to determine a range of skin tone values for the object. This range of sampled skin tone values for the analyzed object are then compared with all the tones contained in the video image, so as to identify other areas in the video sequence having the same skin tone values. The skin detector 60 incorporates a shape locator 61 and a tone detector 62 as illustrated in FIG. 5.

Shape locator 61 initially locates one or more likely skin areas in a video frame based on the identification of edges of objects in the video frame and a determination of whether any such edges approximate the outline of a predetermined shape. Examples of shapes that are likely to include skin areas include ellipses, arcs, and curves. The term curve as used in this disclosure refers to a shape having at least a portion of an edge that is not a straight line.

Figure 6:
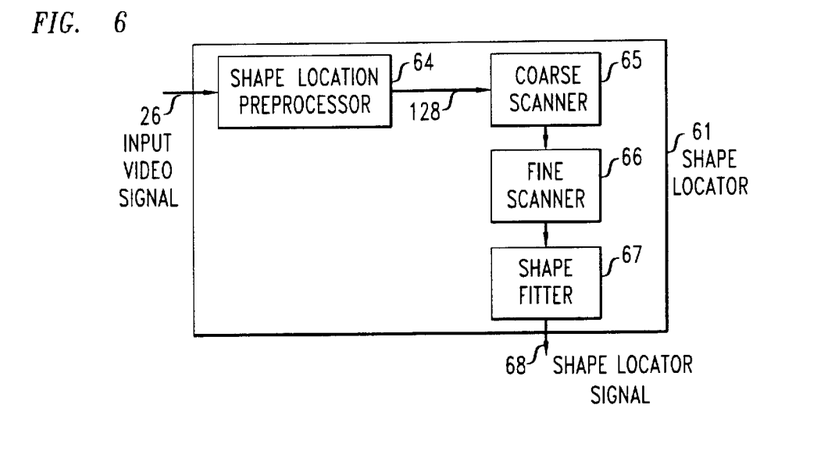
FIG. 6 shows a block diagram of the shape locator of FIG. 5.

The component parts of shape locator 61 are illustrated in FIG. 6 and include a shape location preprocessor 64 as well as a coarse scanner 65, a fine scanner 66, and a shape fitter 67. The shape fitter 67 generates a shape locator signal 68, which is provided to the tone detector 62.

The shape location preprocessor 64 functions to analyze regions of input video signal 26 and identify the edges of objects contained in the video frame, incorporating the same component parts as preprocessing circuit 52, depicted in FIG. 4. Since the function of shape location preprocessor 64 is identical to previously described preprocessing circuit 52, assume that all edge information necessary to perform skin detection is determined, as previously discussed for preprocessing circuit 52. Also, the inclusion of shape location preprocessor 64 as a component part of shape locator 61 is optional, since it is contemplated that if image parameter extractor 50 includes both an edge detector, such as, edge detector 51 and a skin detector, such as, skin detector 60, that edge information be obtained from preprocessing circuit 52, of edge detector 51.

Referring again to FIG. 6, the edge data signals generated by the shape location preprocessor 64 (or optionally obtained from preprocessing circuit 52 of edge detector 51), are input to the coarse scanner 65 of shape locator 61. The coarse scanner 65 segments the edge data signals into blocks of size B×B pixels; for example, of size 5×5 pixels. Each block is then marked by the coarse scanner 65, if at least one of the pixels in the block has a non-zero value based on edge analysis, as discussed above. The array of segmented B×B blocks is then scanned in for example, a left-to-right, top-to-bottom fashion, searching for contiguous runs of marked blocks. For each such run of marked blocks, fine scanning and shape fitting are performed. The inclusion of coarse scanner 65 as a component part of shape locator 61 is optional depending on the computational complexity of the system utilized.

The fine scanner 66 scans the pixels in each contiguous run of segmented and marked B×B blocks, for example, in a left-to-right, top-to-bottom fashion, to detect the first pixel in each line of pixels that has a non-zero value and the last pixel in each line of pixels that has a non-zero value. The first and last non-zero detected pixels of each line are labeled with coordinates ($x_{start}$, y) and ($x_{end}$, y), respectively.

The shape fitter 67 scans the coordinates labeled ($x_{start}$, y) and ($x_{end}$, y) on each line of pixels. Geometric shapes of various sizes and aspect ratios stored in the memory of the shape fitter 67 that are likely to contain skin areas are then compared to the labeled coordinate areas, in order to determine approximate shape matches. Having determined a shape outline from a well fitting, match of a predetermined shape that is likely to contain a skin area, such as, for example, an ellipse, the shape locator generates a shape location signal 68 based on coordinates of the well-fitted shape, and provides such a shape location signal to the tone detector 62.

Once shape locator 61 has identified the location of an object with a border that indicates the object is likely to contain a skin area, tone detector 62 functions to analyze whether such an object contains signal energies that are characteristic of skin regions. The term signal energy as used herein refers to the sum of the squares of the luminance (brightness) for a specified group of pixels of the video signal. The signal energy includes two components: a direct current (DC) signal energy and an alternating current (AC) signal energy. If the object contains signal energies that are characteristic of skin regions the tone detector 62 samples the color tones of the object, in order to identify a range of skin tone values. The tone detector 62 then compares the identified range of skin tone values, to the color tones of the rest of the video frame in order to identify other areas containing the same skin tone values.

Color digital video signals contain red (R), green (G) and blue (B) color components and are typically available in a standard YUV color video format, where Y represents the luminance and both U and V represent the chrominance. The luminance (Y) characterizes the brightness of the video image, while the chrominance (U,V) defines two color difference values, $C_r$ and $C_b$. The relationships between the luminance, the color difference values $C_r$ and $C_b$, and the three color components R, G and B are typically represented as:

$$Y=0.299R+0.587G=0.114B$$

$$C_r=R-Y$$

$$C_b=B-Y$$

Figure 7:
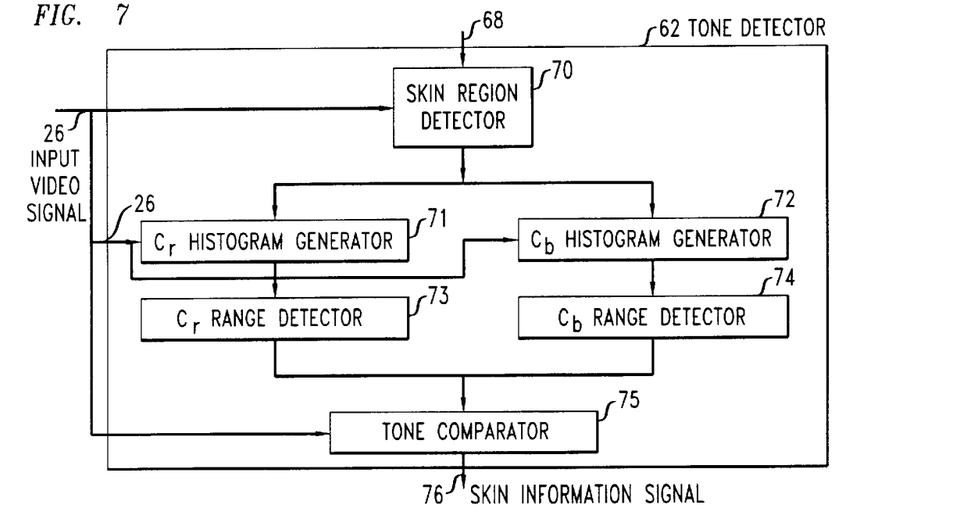
FIG. 7 shows a block diagram of the tone detector of FIG. 5.

In one embodiment of the present invention, tone detector 62, as illustrated in FIG. 7, includes a skin region detector 70, a $C_r$ histogram generator 71, a $C_b$ histogram generator 72, a $C_r$ range detector 73, a $C_b$ range detector 74, and a tone comparator 75.

Figure 8:
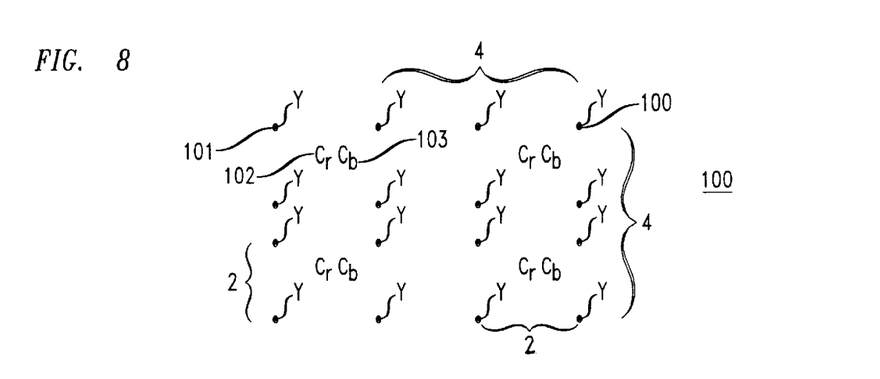
FIG. 8 illustrates a 4×4 block of pixels.

Skin region detector 70 correlates the input video signal 26 with the shape location signal 68, so that the objects identified in the video frame, by the shape locator 61 are segmented into blocks of D×D pixels. Skin detector 60 advantageously segments the identified shape into blocks of 2×2 pixels, where D=2, in order to obtain one luminance value for each pixel as well as one $C_r$ value and one $C_b$ value for every block of 2×2 pixels. As an illustrative example, FIG. 8 shows a 4×4 block of pixels 100. A luminance value (Y) 101 is present for each pixel 100. In contrast, each block of 2×2 pixels has one $C_r$ value 102 and one $C_b$ value 103, which is present at the ½ dimension in both the horizontal and vertical directions. Thus, each block of 2×2 pixels includes four luminance (Y) values 101, as well as one $C_r$ value 102 and one $C_b$ value 103. Such segmentation, to include only one $C_r$ value and only one $C_b$ value is important when skin tone sampling is performed fore an identified object, as discussed below.

Skin region detector 70 functions to analyze which of the blocks of D×D pixels lying within the perimeter of an identified object represents skin areas by determining whether each D×D block of pixels have signal energies characteristic of a skin region. The luminance (Y) of the color video signal has two signal energy components an alternating current (AC) energy component and a direct current (DC) energy component. Skin area pixels typically have AC energy components with values less then a specified threshold energy, $T_{en}$.

Skin areas are detected based on the calculation of the AC energy components for the luminance (Y) of the color video signal. Methods including the discrete cosine transformation (DCT) technique, as described in ITU-T Recommendation H.263("Video coding for narrow communication channels") are useful for calculating the signal energies of the luminance (Y). As an illustrative example, the AC energy components and the DC energy components of the luminance for each block of D×D pixels, are determined by first calculating the discrete cosine transformation (DCT) function, F(u,v), for each pixel, as shown below from equation (1):

$$F(u, v) = C(u)C(v) \sum_{i=0}^{1} \sum_{j=0}^{1} f(i, j) \cos\frac{(2i+1)u}{4}\pi \cos\frac{(2j+1)u}{4}\pi \quad (1)$$

where F(u,v) represents the discrete cosine transformation (DCT) function and C(u) and C(v) are defined as $C(\omega) = 1/\sqrt{2}$ for $\omega = 0$ $C(\omega) = 1$ for $\omega = 1, 2, 3, \ldots$ which are summed for each pixel location F(u,v) of the block of D×D pixels. The AC signal energy, E(m,1), is then determined by subtracting the square of the direct current (DC) signal energy, $F_{m,1}(0,0)$, from the square of the discrete cosine transformation function, F(u,v), as shown in equation (2)

$$E_{m,1} = \sum_{u=0}^{1} \sum_{v=0}^{1} F_{m,1}(u, v)^2 - F_{m,1}(0, 0)^2 \quad (2)$$

The AC signal energy, E(m,1), is then compared to a threshold energy, $T_{en}$. For each D×D block of pixels, if the AC signal energy, E(m,1), is less than a preselected threshold energy, $T_{en}$, the block of pixels is identified as a skin area, as indicated below, $E(m,1) < T_{en}$ Skin area $E(m,1) \geq T_{en}$ Non-skin area Typically, when a D×D block of pixels has an AC signal energy value that is less than 120,000 such a block of pixels is identified as a skin region. It is advantageous to utilize the signal energy components of the luminance parameter to determine skin areas, since non-skin areas tend to have much higher signal energy components than do skin areas. Identifying such non-skin areas and eliminating them from the color sampling process increases the probability that the color of a sampled pixel is actually a skin area pixel, and thus improves the accuracy of the range of tones to be sampled.

Once a block of D×D pixels has been identified by the skin region detector 70, as a skin region, the $C_r$ values and the $C_b$ values of the block of D×D pixels are sampled by the $C_r$ histogram generator 71 and the $C_b$ histogram generator 72, respectively. As previously discussed, it is advantageous if the blocks of D×D pixels, are 2×2 blocks of pixels, since such blocks contain only one $C_r$ value and one $C_b$ value. Both the $C_r$ histogram generator 71 and the $C_b$ histogram generator 72 then generate histograms for the sampled $C_r$ and $C_b$ values, respectively.

Once a $C_r$ histogram and a $C_b$ histogram have been generated, the range of color tones representative of skin tone for the sampled object are determined by the $C_r$ range detector 73 and the $C_b$ range detector 74, using statistical analysis techniques. For example, with each data set the mean and mode $C_r$ and $C_b$ values are determined for the blocks of D×D pixels sampled. When the mean and mode $C_r$ and $C_b$ values are within some specified distance, $D_p$, of each other, such mean and mode $C_r$ and $C_b$ values are identified as representing a single peak. Thereafter, for each block of D×D pixels, if a pixel color tone is within a predetermined distance, for example, one standard deviation, of such mean and mode $C_r$ and $C_b$ values representative of a single peak, then the pixel color tone is included in the range of skin tone values. When the mean and mode are within a distance greater then the specified distance $D_p$, such mean and mode $C_r$ and $C_b$ values are identified as representing two individual peaks. The pixel color tones for blocks of D×D pixels with mean and mode $C_r$ and $C_b$ values that are representative of two individual peaks, are not included in the range of skin tone values.

Based on the range of $C_r$ and $C_b$ values generated in the $C_r$ range detector 73 and the $C_b$ range detector 74, respectively, the tone comparator 75 analyzes the entire frame of the input video signal 26, to locate all other pixels containing the same chrominance values. When such other pixels are located, a skin information signal 76 denoting the location of such skin areas is generated by the tone comparator 75 and provided to filter selector 90.

Skin detector 60 performs the above described analysis for each frame of a video sequence or optionally analyzes a single frame and then the tone comparator 75 utilizes that range of skin tone values to identify skin areas in a specified number of subsequent frames.

Figure 9:
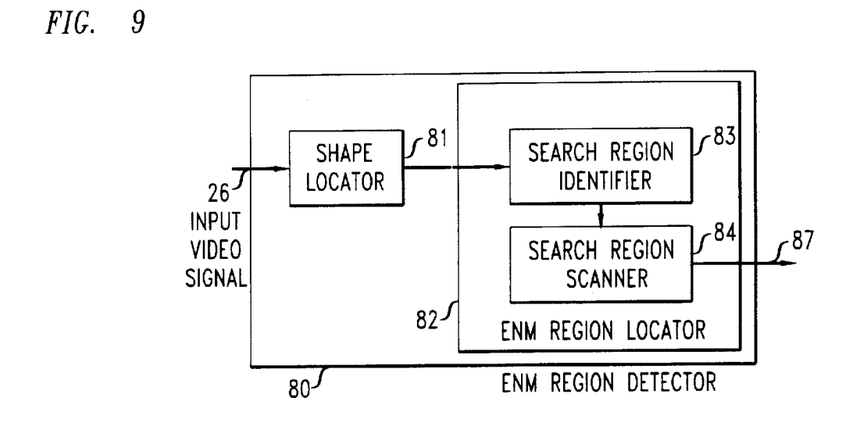
FIG. 9 is a block diagram of the eyes-nose-mouth (ENM) region detector of FIG. 3.

In one embodiment of the present invention, wherein the image parameter optionally identified are the pixels associated with an eyes-nose-mouth (ENM) region, the image parameter extractor 50 includes an eyes-nose-mouth (ENM) region detector 80, as shown in FIG. 3. The ENM region detector 80 advantageously functions to initially analyze the shapes of objects in the video sequence to locate objects that are likely to contain faces. Objects that are likely to contain faces are further analyzed to identify if such objects have an eyes-nose-mouth (ENM) region. The ENM region detector 80 incorporates a shape locator 81 and an eyes-nose-mouth (ENM) locator 82, as illustrated in FIG. 9.

Shape locator 81 of ENM region detector 80, locates objects in a video frame that are likely to contain faces based on the identification of the edges of objects and a determination that such edges approximate the outline of a predetermined shape. For example, since an ellipse approximates the shape of a person's face or head, the analysis of the video sequence to identify those outlines of objects which approximate ellipses, advantageously determines some locations in the video sequence that are likely to contain an eyes-nose-mouth region.

Shape locator 81 incorporates the same component parts as shape locator 61, depicted in FIG. 6. Since the function and component parts of shape locator 81 are identical to previously described shape locator 61, assume that all shape location information necessary to perform ENM region detection is determined, as previously discussed for shape locator 61. Also, the inclusion of shape locator 81 as a component part of ENM region detector 80 is optional, since it is contemplated that if image parameter extractor 50 includes both a skin detector, such as, skin detector 60, and an ENM region detector, such as, ENM region detector 80, that shape location information be obtained from shape locator 61 of skin detector 60.

Referring again to FIG. 9, when the outline of an object or objects identified by shape locator 81 (or optionally identified by shape locator 61, of skin detector 60) match well fitting ellipses, such shape location information is provided to eyes-nose-mouth (ENM) region locator 82. The ENM region locator 82 then utilizes symmetry based techniques to determine whether the well fitting ellipse has an eyes-nose-mouth region. The ENM region locator 82 includes a search region identifier 83 and a search region scanner 84.

Figure 10:
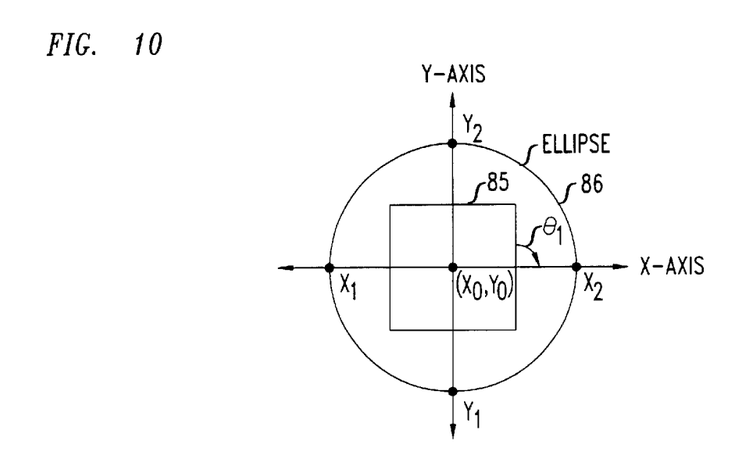
FIG. 10 illustrates a rectangular window located within an ellipse.

The ENM region detector 82 receives the coordinates of the well-fitted ellipse and segments the identified object into a rectangular window and a compliment area (containing the remainder of the identified object not located within the rectangular window). As an illustrative example, FIG. 10 shows a well fitting elliptical outline that is segmented into a rectangular window 85 and a compliment area 86 (containing the remainder of the ellipse not located within the rectangular window 85). The ENM region detector 82 utilizes symmetry based analysis to position the rectangular window, such as rectangular window 85, so as to capture the region of the ellipse corresponding to the eyes, nose, and mouth region.

The ENM region detector 82 determines a search region for locating the rectangular window, such as, rectangular window 85, using the search region identifier 83, where coordinates of the center point ($x_0$, $y_0$) of the elliptical outline shown in FIG. 10, are used to obtain estimates for the positioning of the rectangular window, such as rectangular window 85.

The search region for locating the center point of the ENM region is typically a rectangle of size S×T pixels such as, for example, 12×15 pixels, and is advantageously chosen to have a fixed size relative to the major and minor axes of the elliptical outline. The term major axis as used in this disclosure is defined with reference to the elliptical outline of FIG. 10 and refers to the line segment bisecting the ellipse between points $y_1$ and $y_2$. The term minor axis as used in this disclosure is also defined with respect to the elliptical outline of FIG. 10 and refers to the line segment bisecting the ellipse between points $x_1$ and $x_2$. As an illustrative example, assume an ellipse has a length along the major axis of 50 pixels and a length along the minor axis of 30 pixels. The size of the rectangular window is advantageously chosen to have a size of 25×15 pixels, which approximates half the length and width of the ellipse along both the major and minor axes and captures the most probable location of the eyes-nose-mouth (ENM) region for the shape.

Once the rectangular window, such as, rectangular window 85, is located within the ellipse, the search region scanner 84 analyzes the rectangular window to determine each candidate position for an axis of symmetry with respect to the eyes-nose-mouth region of the object. An axis of symmetry is a line segment which divides an object into equal parts. Faces and heads that are depicted symmetrically, have an axis of symmetry vertically positioned between the eyes, through the center of the nose and half way across the mouth. Each half is symmetric because each contains one eye, half of the nose and half of the mouth. For example, with reference to FIG. 10, search region scanner 84, in a left-to-right fashion, selects each vertical row of pixels within rectangular window 85 using a line segment placed parallel to the major axis, in order to search for an axis of symmetry, positioned between the eyes, through the center of the nose and halfway through the mouth.

After the axis of symmetry is determined with respect to a facial axis, the ENM region detector 82 generates an ENM region signal 87 corresponding to the coordinates of the pixels associated with the eyes-nose-mouth region of the rectangular window, such as, rectangular window 85. The ENM signal 87 notifies the filter selector 90, of the pixels associated with an eyes-nose-mouth region for the ellipse.

Detection of the eyes-nose-mouth region may also be affected when the subject does not look directly at the camera, era, which often occurs for example, in video conferencing situations. The ENM region detector 80 also includes detection of an eyes-nose-mouth region for an input video image where the subject does not directly face the camera, the subject has facial hair and/or wears eyeglasses. The ENM region detector 80 exploits the typical symmetry of facial features with respect to a longitudinal axis going through the nose and across the mouth, where the axis of symmetry may be slanted at an angle $\theta_1$ with respect to the vertical axis y, as illustrated on the ellipse shown in FIG. 10. For such slanted ellipses, the rectangular window 85 is rotated by discrete angle values about the center of the window, in order to provide robustness in the detection of the eyes-nose-mouth region. Advantageously, angle $\theta_1$ has a value within the range of −10 degrees to 10 degrees.

Figure 11:
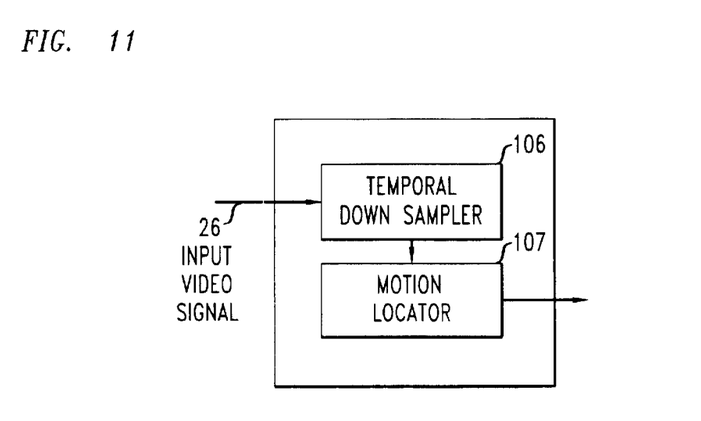
FIG. 11 is a block diagram of the moving region detector of FIG. 3.

In one embodiment of the present invention, wherein the image parameter optionally identified is the location of a moving object, image parameter extractor 50 includes a moving region detector 105, as shown in FIG. 3. Moving region detector 105 advantageously functions to identify the pixels associated with a moving object using block-based motion estimation techniques. Block-based motion compensation techniques segment several frames of the video sequence into image blocks and then analyzes the image blocks in a previous frame of the video sequence, to predict the location of these same image blocks in the present frame. The magnitude of the displacement between the location of pixel intensities identified in a previous image block to the shifted location of these same identified pixel intensities in the current image block determines the region of movement for an object in a frame of the video sequence. The moving region detector 105 incorporates a temporal downsampler 106 and a motion locator 107, as illustrated in FIG. 1.

Temporal filter 106 functions to limit the number of frames of the video signal that are available for motion detection by limiting the number of frames available in input video signal 26. The temporal downsampler 106 incorporates the same component part as temporal downsampler 53 of preprocessing circuit 52, depicted in FIG. 4. Since the function of temporal downsampler 106 is identical to previously described temporal downsampler 53, assume that limiting the number of frames to perform motion detection is determined, as previously discussed. Also, the inclusion of temporal downsampler 106 as a component part of moving region detector 105 is optional, since it is contemplated that if image parameter extractor 50 includes an edge detector, such as skin detector 60, that limiting the number of frames be obtained from either temporal downsampler of preprocessing circuit 52 of edge detector 51, or from temporal downsampler of shape location preprocessor 64 of skin detector 60.

Figure 12:
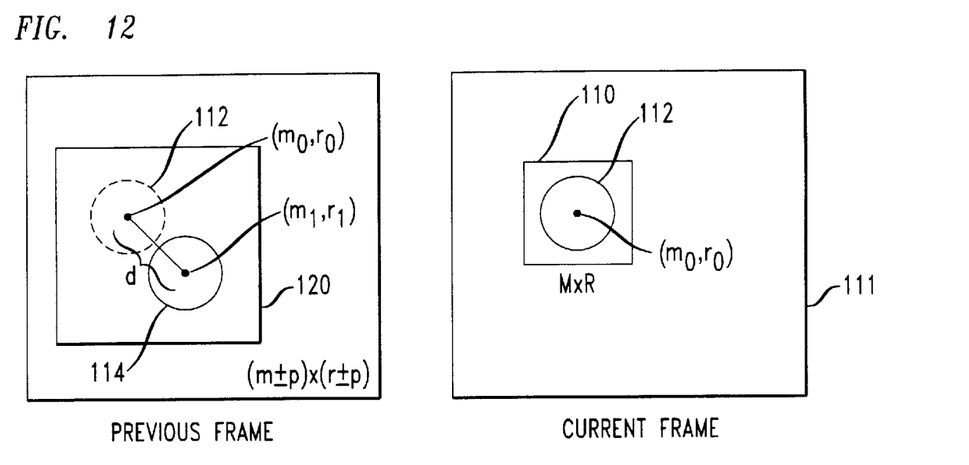
FIG. 12 illustrates the block-based motion compensation technique of a moving region detector.

Limiting the number of frames in current video frame obtained by temporal downsampler 106 (or optionally obtained from temporal downsampler of preprocessing circuit 52 of edge detector 51, or from temporal downsampler of shape location preprocessor 64 of skin detector 60), are input to motion locator 107. Motion locator 107 segments the input signal for the current frame, into image blocks of size M×R pixels, for example, of size 16×16 pixels, with a center point ($m_0$, $r_0$). Thereafter, motion locator 107 locates the center point ($m_0$, $r_0$) corresponding to the location of image block M×R for the previous frame of the video sequence, and analyzes an area of pixels corresponding to an image block of size (M±p)×(R±p) (where p is the number of pixels by which the image block M×R, as represented in the current frame is increased), which defines the size of the image block in the previous frame that is to be analyzed. As an illustrative example, a block of size M×R pixels 110 for a current frame 111 of the video sequence and the corresponding block of size (M±p)×(R±p) pixels 120 for the previous frame 116 of the video sequence, are shown in FIG. 12.

Motion locator 107 scans the pixel intensities of image block M×R 110 for the current frame 111, in order to estimate the pixel matching of objects. Motion locator 107 also scans the pixel intensities of image block (M±p)×(R±p) 120 for the previous frame 116, to estimate the pixel matching of objects. Motion locator 107 scans the pixel intensities in both frames of the video sequence, for example, in a left-to-right, top-to-bottom fashion, and then compares them to each other so as to measure the magnitude of the displacement for the pixel matching of any objects.

The magnitude of the displacement defines the pixel locations of the moving region in the current frame of the video sequence. For example, with reference to FIG. 12, the outline of a circle 112 is depicted in image block M×R 110 of the current frame 111. Similarly, in the image block 120 of the previous frame 116, the outline of a circle 114 identical in size to circle 112 is depicted (the location of circle 112 corresponding to center point ($m_0$, $r_0$) is also depicted with dashed lines). A comparison of the location of circle 114 to the location of circle 112 illustrates that the location of the center point ($m_1$, $r_1$) for circle 114 is shifted a distance, d, away from center point ($m_0$, $r_0$) of circle 112. The distance, d, represents the magnitude of the displacement for the two circles 112 and 114 and defines the pixel locations for the moving region of the object. When such a moving region is located, a moving region information signal 117, denoting the pixel locations for such a moving region is generated by the moving region detector 105 and provided to filter selector 90.

Background areas of the video image are also identifiable by image parameter extractor 50. Background areas are the last image parameter identified by the image parameter extractor 50 and represent those pixel locations of a video image that are not included in any other previously identified image parameter regions, such as, the skin areas, eyes-nose-mouth regions, and moving regions. For example, suppose a video sequence contains a person facing a video camera. If the image parameter extractor, such as image parameter extractor 56, is programmed to only identify skin areas and the edges of objects, than all pixels that are not identified as skin pixels and which do not comprise the outline of the person facing the video camera, are determined by image parameter extractor 50 to represent background area pixels. The location of background areas are provided by image parameter extractor 50 to filter selector 90 as part of the image parameter location signal 100.

Referring again to FIG. 2, once the image parameter extractor 50 has identified the pixels associated with image parameters, as discussed above, the filter selector 90 ranks the relative importance of each identified image parameter to the overall content of the video sequence. Thereafter, based on the ranking of each identified image parameter, filter selector 90 determines a filtering factor for adjusting the strength of filter 95, that subsequently filters the pixels associated with each identified image parameter.

Filter selector 90 is advantageously programmed to rank the relative importance of each identified image parameter to the video sequence content, based on perceptual semantics. The term perceptual semantics as used herein refers to the differentiation of subject matter in a video image according to viewer focus. Thus, filter selector 90 ranks the image parameters identified by image parameter extractor 50 in the video sequences based upon the most probable focus of the viewer. For example, in the context of video conferencing, video sequences typically contain one or more persons in a room who are facing a camera. Since a person viewing such images tends to focus his or her attention to the person or persons in the room and specifically toward their faces and hands, rather than toward those background areas surrounding a person's head, the pixels associated with the eyes-nose-mouth (ENM) region of a face is likely ranked as more important than the pixels associated with skin areas. Similarly, the pixels associated with the skin areas of a face are likely ranked as more important than the pixels associated with the background areas surrounding the person's head.

Figure 13:
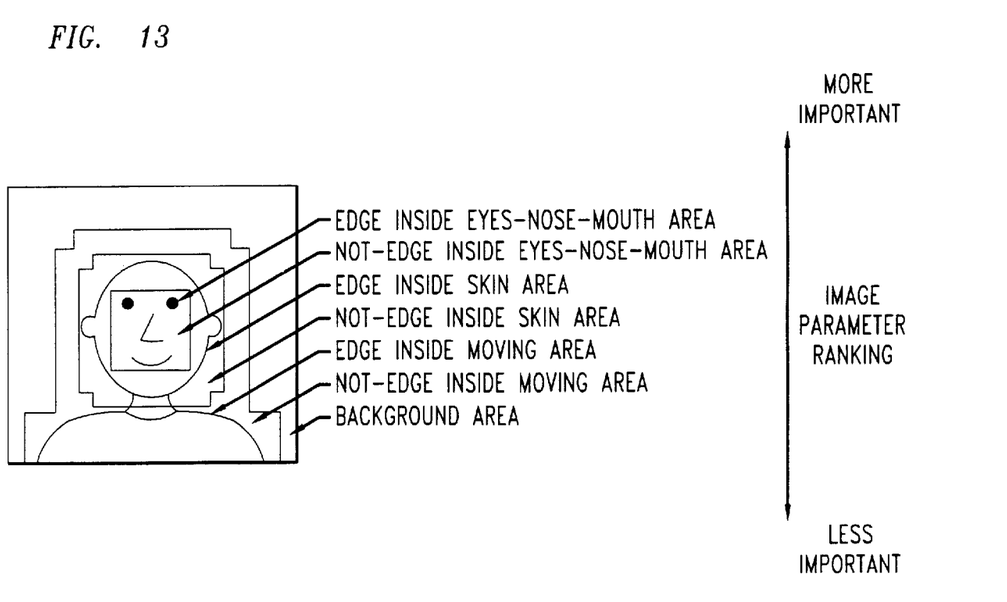
FIG. 13 shows one example of image parameter ranking based on the importance of the image parameters to the overall video sequence.

FIG. 13 illustrates one example where the ranking of a group of identified image parameters is performed by filter selector 90. The video image depicted in FIG. 13 shows a person in a room facing a camera where the image parameters identified by image parameter extractor 50 include an eyes-nose-mouth (ENM) region, skin areas, edge areas, moving areas, and background areas. Filter selector 90 ranks the identified image parameters of this example according to the most probable focus of a viewer who views such a video sequence. Since a person viewing such images tends to focus his or her attention toward the person in the room, and specifically at the face of such person, the pixels associated with edges that are inside the eyes-nose-mouth (ENM) region are ranked more important than pixels associated with any of the other image parameters. Similarly, the pixels associated with skin areas are ranked as more important than pixels associated with moving areas, with the pixels associated with background areas being the least important.

After the image parameters identified by the image parameter extractor 50 are ranked according to their relative importance, filter selector 90 determines a filtering factor, N, for adjusting the strength of filter 95, which filters the pixels associated with each identified image parameter. The filter strength defines the range of frequencies filtered by a filter, such as, filter 95. A weak filter strength defines a wide range of frequencies for the filter, so that very little image information (bytes) gets eliminated from the video sequences. In contrast, a strong filter strength defines a narrow range of frequencies for the filter, which results in the elimination of large amounts of image information (bytes) from the video sequences.

Filter selector 90 advantageously selects a filtering factor, N, to apply the weakest filter strength to the pixels associated with image parameters that are ranked as most important to the content of the video sequence, so as not to eliminate important image information. For example, with reference to FIG. 13, the pixels associated with edges inside an ENM region that was ranked as most important to the content of the video sequence are assigned a filtering factor designed to filter such pixels with the weakest filter strength. This means that very little image information (bytes) is intended to be eliminated from these pixels, since a weak filter strength defines a wide range of frequencies for the filter. In contrast, the pixels associated with background areas that were ranked as least important to the content of the video sequence are assigned a filtering factor designed to filter such pixels with the strongest filter strength.

The filtering factor, N, has a numerical value which is typically defined by 1<N<256. The larger values for N correspond to weaker filters, while the smaller values for N correspond to stronger filters. Values for the filtering factor greater than 256 are not useful, because when N is greater than 256 the filter multiplier (i.e., $1/(2+N)^2$, discussed below) becomes a very large number and exceeds the precision for calculating small numbers. For example, if N=256 the multiplier $1/(2+N)^2$ is calculated as $1/(2+256)^2 = 1.5 \times 10^5$, which is a very large number. Examples of filtering factors that might be assigned to selected image parameters are shown in Table I.

TABLE I

| Region | CIF* | QCIF** |
|---|---|---|
| Edge ENM region | 16 | 64 |
| Non-edge ENM region | 8 | 32 |
| Edge skin area | 8 | 32 |
| Non-edge skin area | 2 | 8 |
| Edge Moving region | 4 | 16 |
| Non-edge moving region | 2 | 8 |

*CIF represents the common intermediate format, which is a standard picture format used for transmitting video signals.
**QCIF represents the quarter-CIF (common intermediate format).

Once the filter factor, N, is determined by filter selector 90, the pixels associated with the identified image parameters are filtered using filter 95. Filter 95 is advantageously a filter of the form, $$F = \frac{1}{(2+N)^2} \begin{vmatrix} 1 & N & 1 \\ N & N^2 & N \\ 1 & N & 1 \end{vmatrix}$$

$$= \frac{1}{(2+N)^2} \begin{vmatrix} 1 & N & 1 \end{vmatrix} \times \begin{vmatrix} 1 & N & 1 \end{vmatrix}$$

where N is the filtering factor. Thereafter the pixels associated with each identified image parameter are filtered by filter 95 using the filtering factor determined by filter selector 90. The filtered video signal is then input to source coder 32 of video codec 10 for encoding.

Object-oriented filter 12 performs the above described analysis for each frame of a video sequence or optionally analyzes a single frame and then filter 95 utilizing the filtering factors selected for such a frame, filters a specified number of subsequent frames of the video sequence.

Object-oriented filter 12 is optionally used in conjunction with a video coder/decoder (codec), such as, video codec 10. The following explanation discusses the operation of object-oriented filter 12 with regard to the other component parts of video codec 10, as shown in FIG. 1. Video codec 10 includes video coder 22 and video decoder 24, where video coder 22 is controlled by coding controller 16.

For coding operations the video codec 10 receives an input video signal 26, which is forwarded to the object-oriented filter 12. Object-oriented filter 12 filters the input video signal 26 as described above and then forwards the filtered video signal to the source coder 32. The video coder 22 codes the filtered video signal under the control of the coding controller 16, to generate an output coded bitstream 30. In one embodiment, the video coder 22 encodes the filtered video signal using a source coder 32, a video multiplex coder 34, a transmission buffer 36, and a transmission coder 38 to generate the output coded bitstream 30.

For decoding operations, the video codec 10 receives an input coded bitstream 40. The video decoder 24 decodes the input coded bitstream 40 using a receiving decoder 42, a receiving buffer 44, a video multiplex decoder 46, and a source decoder 48 for generating the output video signal 50.

It should, of course be understood that while the present invention has been described with reference to an illustrative embodiment, other arrangements may be apparent to those of ordinary skill in the art.

The invention claimed is:

1. An apparatus for filtering a video signal, the apparatus comprising:
    a first connector adapted to receive a video signal;
    an extractor which analyzes the video signal and identifies pixels in the video signal that are associated with at least two predetermined image parameters, wherein the number of pixels associated with one of the image parameters is less than the total number of pixels in the video signal;
    a selector which assigns a first predetermined factor to the pixels associated with at least one of the predetermined image parameters;
    a filter which filters the video signal, wherein the filter strength applied to the pixels that are assigned the first predetermined factor is different from the filter strength applied to at least one other pixel in the video signal; and
    a second connector adapted to transmit the filtered video signal.

2. The apparatus of claim 1, wherein the selector ranks the predetermined image parameters based on their overall importance to the video sequence.

3. The apparatus of claim 1, wherein the selector assigns the first predetermined factor a value within the range 1<N<256.

4. The apparatus of claim 1, wherein the extractor identifies pixels associated with an edge parameter.

5. The apparatus of claim 4, wherein pixels associated with the edge parameter are identified based on changes in the magnitude of the pixel intensities for adjacent pixels.

6. The apparatus of claim 1, wherein the extractor identifies pixels associated with a skin area parameter.

7. The apparatus of claim 6, wherein pixels associated with the skin area parameter are determined by analyzing the shapes of objects in the video signal to identify objects of a desired shape and determining whether at least one pixel from an object of the desired shape has a luminance indicative of a skin area.

8. The apparatus of claim 1, wherein the extractor identifies pixels associated with an eyes-nose-mouth (ENM) region parameter.

9. The apparatus of claim 8, wherein pixels associated with the ENM region parameter are determined by analyzing the shapes of objects in the video signal to identify objects that are likely to contain faces, and determining whether the identified objects likely to contain faces have an axis of symmetry.

10. The apparatus of claim 1, wherein the extractor identifies pixels associated with a moving region parameter.

11. The apparatus of claim 10, wherein pixels associated with the moving region parameter are identified using block based motion estimation techniques.

12. A method of filtering a video signal, the method comprising the steps of:

receiving a video signal;

analyzing the video signal to identify pixels in the video signal that are associated with at least two predetermined image parameters, wherein the number of pixels associated with one of the image parameters is less than the total number of pixels in the video signal;

assigning a first predetermined factor to the pixels associated with at least one of the predetermined image parameters;

filtering the video signal, wherein the filter strength applied to the pixels that are assigned the first predetermined factor is different from the filter strength applied to at least one other pixel in the video signal; and transmitting the filtered video signal.

13. The method of claim 12, wherein the predetermined image parameters are ranked based on their overall importance to the video sequence.

14. The method of claim 12, wherein the first predetermined factor assigned to the pixels associated with at least one of the predetermined image parameters is within the range 1<N<256.

15. The method of claim 12, wherein one of the at least two predetermined image parameters identified in the video signal is an edge parameter.

16. The method of claim 15, wherein pixels associated with the edge parameter are identified based on changes in the magnitude of the pixel intensities for adjacent pixels.

17. The method of claim 12, wherein one of the at least two predetermined image parameters identified in the video signal is a skin area parameter.

18. The method of claim 17, wherein the pixels associated with the skin area parameter are identified by analyzing the shape of objects in the video signal to locate objects of a desired shape, and determining whether at least one pixel from an object of the desired shape has a luminance indicative of a skin area.

19. The method of claim 12, wherein one of the at least two predetermined image parameters identified in the video signal is an eyes-nose-mouth (ENM) region parameter.

20. The method of claim 19, wherein the pixels associated with the eyes-nose-mouth (ENM) region parameter are identified by analyzing the shapes of objects in the video signal to identify objects that are likely to contain faces, and determining whether such identified objects likely to contain faces have an axis of symmetry.

21. The method of claim 12, wherein one of the at least two predetermined image parameters identified in the video signal is a moving region parameter.

22. The method of claim 21, wherein the pixels associated with the moving region parameter are identified using block based motion estimation techniques.

* * * * *